United States Patent
Narang et al.

(10) Patent No.: US 11,329,870 B2
(45) Date of Patent: ***May 10, 2022

(54) UTILIZING MACHINE LEARNING TO REDUCE CLOUD INSTANCES IN A CLOUD COMPUTING ENVIRONMENT

(71) Applicant: Capital One Services, LLC, McLean, VA (US)

(72) Inventors: Sunil Narang, Glen Allen, VA (US); Abhishek Kumar Singh, Henrico, VA (US); Nazia Sarang, Henrico, VA (US); Vikas Vijay, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,384

(22) Filed: Mar. 1, 2021

(65) Prior Publication Data
US 2021/0184923 A1 Jun. 17, 2021

Related U.S. Application Data

(63) Continuation of application No. 16/527,461, filed on Jul. 31, 2019, now Pat. No. 10,938,637, which is a
(Continued)

(51) Int. Cl.
*H04L 29/08* (2006.01)
*H04L 41/0803* (2022.01)
(Continued)

(52) U.S. Cl.
CPC ......... *H04L 41/0803* (2013.01); *G06N 20/00* (2019.01); *H04L 41/0654* (2013.01);
(Continued)

(58) Field of Classification Search
CPC ............ H04L 41/0803; H04L 41/0654; H04L 67/1002; G06N 20/00
See application file for complete search history.

(56) References Cited

U.S. PATENT DOCUMENTS

9,871,745 B2 * 1/2018 Steinder .................. H04L 67/16
9,928,059 B1 3/2018 Sartor et al.
(Continued)

OTHER PUBLICATIONS

Docker Inc., "Swarm Mode Overview," Jun. 20, 2016, 3 pages. Retrieved from Internet:[URL:https://docs.docker.com/engine/swarm/].
(Continued)

*Primary Examiner* — Viet D Vu
(74) *Attorney, Agent, or Firm* — Harrity & Harrity, LLP

(57) ABSTRACT

A device receives, from a cloud computing environment, cloud instance information associated with cloud instances in the cloud computing environment, and processes the cloud instance information, with a machine learning model, to determine containers for one or more of the cloud instances and whether cloud instances should be removed from the cloud computing environment. The device causes a first subset of the cloud instances to be removed from the cloud computing environment, based on determining which of the cloud instances should be removed, and causes the containers to be created for a second subset of the cloud instances based on determining the containers. The device receives, from the cloud computing environment, cloud container information associated with the containers created in the cloud computing environment, and causes one or more of the containers to be scaled based on the cloud container information.

20 Claims, 14 Drawing Sheets

Related U.S. Application Data continuation of application No. 16/002,952, filed on Jun. 7, 2018, now Pat. No. 10,382,260.

(51) Int. Cl.
| | |
|---|---|
| *H04L 41/0654* | (2022.01) |
| *H04L 67/1001* | (2022.01) |
| *G06N 20/00* | (2019.01) |
| *H04L 41/16* | (2022.01) |
| *H04L 41/5009* | (2022.01) |
| *H04L 41/50* | (2022.01) |

(52) U.S. Cl.
CPC .......... *H04L 41/16* (2013.01); *H04L 67/1002* (2013.01); *H04L 41/5012* (2013.01); *H04L 41/5096* (2013.01)

(56) References Cited

U.S. PATENT DOCUMENTS

| | | |
|---|---|---|
| 10,382,260 B1 | 8/2019 | Narang et al. |
| 10,938,637 B2 | 3/2021 | Narang et al. |
| 2011/0055398 A1 | 3/2011 | Dehaan et al. |
| 2011/0173328 A1 | 7/2011 | Park et al. |
| 2013/0268799 A1 | 10/2013 | Mestery et al. |
| 2014/0059226 A1 | 2/2014 | Messerli et al. |
| 2015/0205819 A1* | 7/2015 | Brand .................. G06F 16/182 707/694 |
| 2016/0182315 A1 | 6/2016 | Salokanto et al. |
| 2016/0350683 A1 | 12/2016 | Bester et al. |
| 2017/0199770 A1 | 7/2017 | Peteva et al. |
| 2017/0244787 A1* | 8/2017 | Rangasamy ........ H04L 41/0654 |
| 2018/0013636 A1* | 1/2018 | Seetharamaiah ..... H04L 41/147 |
| 2018/0095778 A1 | 4/2018 | Aydelott et al. |
| 2018/0189121 A1 | 7/2018 | Jobi et al. |
| 2018/0349168 A1 | 12/2018 | Ahmed |
| 2019/0205408 A1* | 7/2019 | Chen .................. G06F 11/0709 |
| 2020/0073717 A1* | 3/2020 | Hari ...................... G06F 9/5061 |

OTHER PUBLICATIONS

Kubernetes., "Production-Grade Container Orchestration," Mar. 10, 2016, 6 pages. Retrieved from Internet:[URL:https://kubernetes.io/].

\* cited by examiner

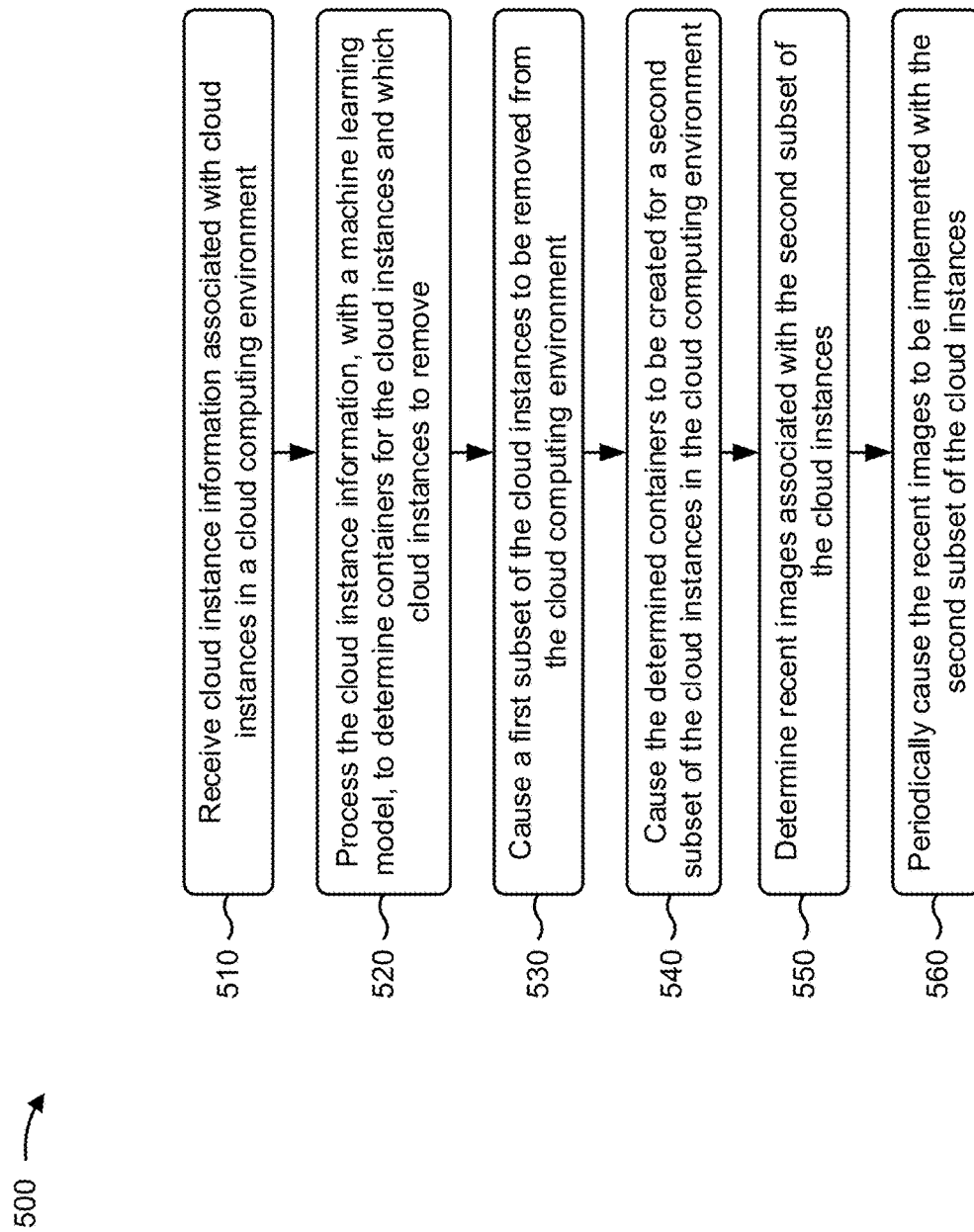

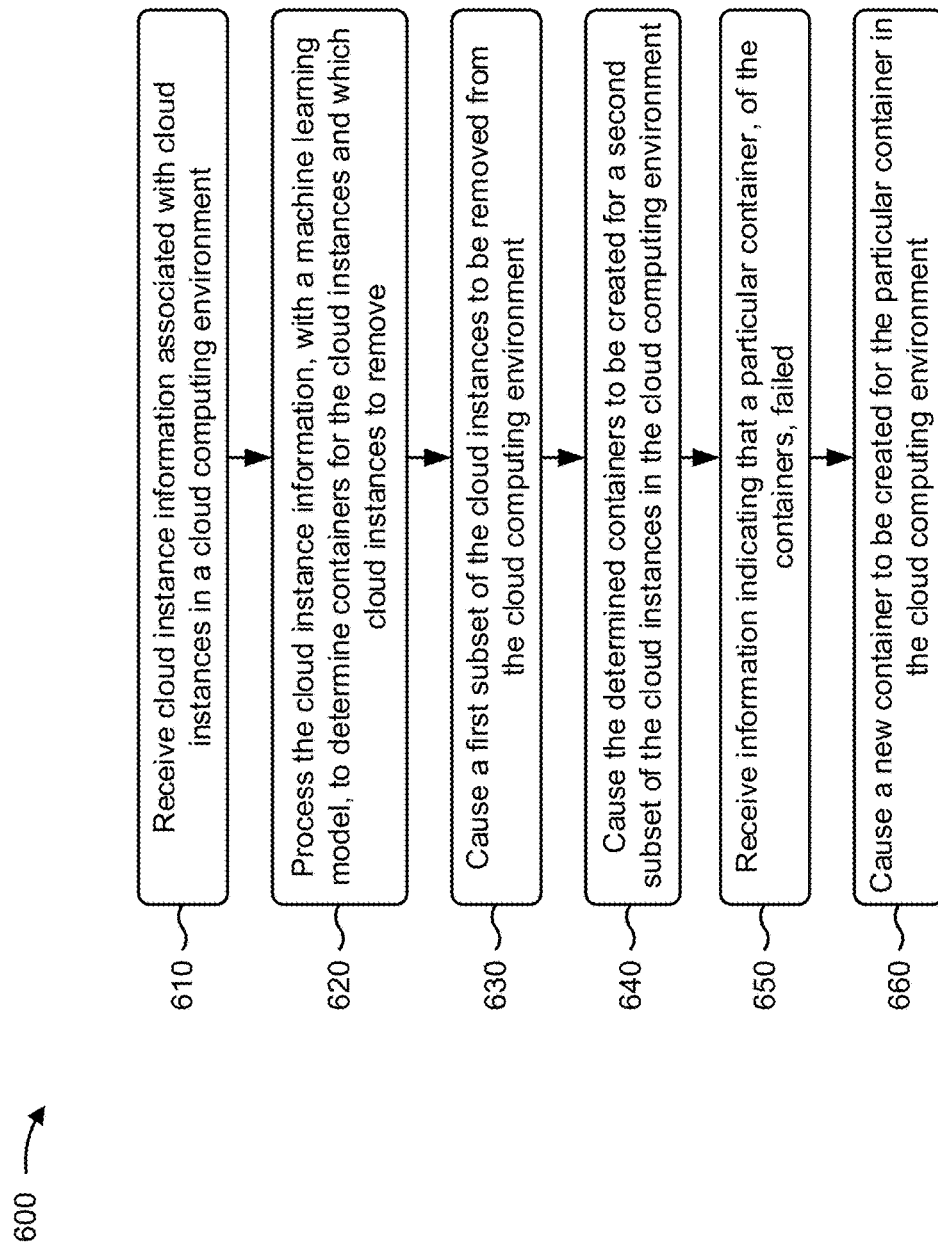

UTILIZING MACHINE LEARNING TO REDUCE CLOUD INSTANCES IN A CLOUD COMPUTING ENVIRONMENT

RELATED APPLICATIONS

This application is a continuation of U.S. patent application Ser. No. 16/527,461, filed Jul. 31, 2019 (now U.S. Pat. No. 10,938,637) which is a continuation of U.S. patent application Ser. No. 16/002,952, filed Jun. 7, 2018 (now U.S. Pat. No. 10,382,260), which are incorporated herein by reference.

BACKGROUND

An entity may utilize a cloud computing environment to provide computation, software, data access, storage, etc. services that do not require end-user knowledge of a physical location and configuration of systems and/or devices that host the services in the cloud computing environment. The cloud computing environment may save costs for the entity since the entity need not purchase hardware systems and/or devices that host the services provided by the cloud computing environment.

SUMMARY

According to some implementations, a device may include one or more memories, and one or more processors, communicatively coupled to the one or more memories, to receive, from a cloud computing environment, cloud instance information associated with cloud instances in the cloud computing environment. The one or more processors may process the cloud instance information, with a machine learning model, to determine containers for one or more of the cloud instances and to determine whether cloud instances should be removed from the cloud computing environment, and may cause a first subset of the cloud instances to be removed from the cloud computing environment, based on determining which of the cloud instances should be removed from the cloud computing environment. The one or more processors may cause the containers to be created for a second subset of the cloud instances, that is different than the first subset of the cloud instances, based on determining the containers for the one or more of the cloud instances. The one or more processors may receive, from the cloud computing environment, cloud container information associated with the containers created in the cloud computing environment, and may cause one or more of the containers to be scaled based on the cloud container information.

According to some implementations, a non-transitory computer-readable medium may store instructions that include one or more instructions that, when executed by one or more processors of a device, cause the one or more processors to receive, from a cloud computing environment, cloud instance information associated with cloud instances in the cloud computing environment. The one or more instructions may cause the one or more processors to process the cloud instance information to determine containers for one or more of the cloud instances and to determine which of the cloud instances to remove from the cloud computing environment, and cause a first subset of the cloud instances to be removed from the cloud computing environment based on determining which of the cloud instances to remove from the cloud computing environment. The one or more instructions may cause the one or more processors to cause the containers to be created for a second subset of the cloud instances, that is different than the first subset of the cloud instances, based on determining the containers for the one or more of the cloud instances. The one or more instructions may cause the one or more processors to determine images associated with the second subset of the cloud instances, and periodically cause the images to be implemented with the second subset of the cloud instances.

According to some implementations, a method may include receiving, by a device and from a cloud computing environment, cloud instance information associated with cloud instances in the cloud computing environment, and processing, by the device, the cloud instance information to determine containers for one or more of the cloud instances and to determine which of the cloud instances to remove from the cloud computing environment. The method may include causing, by the device, a first subset of the cloud instances to be removed from the cloud computing environment based on determining which of the cloud instances to remove from the cloud computing environment, and causing, by the device, the containers to be created for a second subset of the cloud instances, that is different than the first subset of the cloud instances, based on determining the containers for the one or more of the cloud instances. The method may include receiving, by the device and from the cloud computing environment, information indicating that a particular container, of the containers, failed, and causing, by the device, a new container to be created for the particular container based on receiving the information indicating that the particular container failed.

BRIEF DESCRIPTION OF THE DRAWINGS

FIG. 5 is a flow chart of an example process for utilizing machine learning to reduce cloud instances in a cloud computing environment and for refreshing cloud instances.

FIG. 6 is a flow chart of an example process for utilizing machine learning to reduce cloud instances in a cloud computing environment and for handling failures.

DETAILED DESCRIPTION

The following detailed description of example implementations refers to the accompanying drawings. The same reference numbers in different drawings may identify the same or similar elements.

As an entity shifts toward utilization of a cloud computing environment, a quantity of cloud instances (e.g., virtual machines) that provide new or existing services may increase more and more every day. However, as the quantity of cloud instances increases, utilization (e.g., processor utilization, memory utilization, and/or the like) of each cloud instance may decrease to sub-optimal levels. Furthermore, a large quantity of cloud instances that are inefficiently utilized may increase costs for the entity to a point where the savings associated with utilizing a cloud computing environment are consumed.

Some implementations described herein provide a container platform that utilizes machine learning to reduce cloud instances in a cloud computing environment. For example, the container platform may receive, from a cloud computing environment, cloud instance information associated with cloud instances in the cloud computing environment, and may process the cloud instance information, with a machine learning model, to determine containers for one or more of the cloud instances and to determine whether cloud instances should be removed from the cloud computing environment. The container platform may cause a first subset of the cloud instances to be removed from the cloud computing environment, based on determining which of the cloud instances should be removed from the cloud computing environment, and may cause the containers to be created for a second subset of the cloud instances, that is different than the first subset of the cloud instances, based on determining the containers for the one or more of the cloud instances. A container may share resources among cloud instances provided within the container so that the cloud instances are more efficiently utilized (e.g., with respect to processor utilization, memory utilization, and/or the like).

Figure 1A:
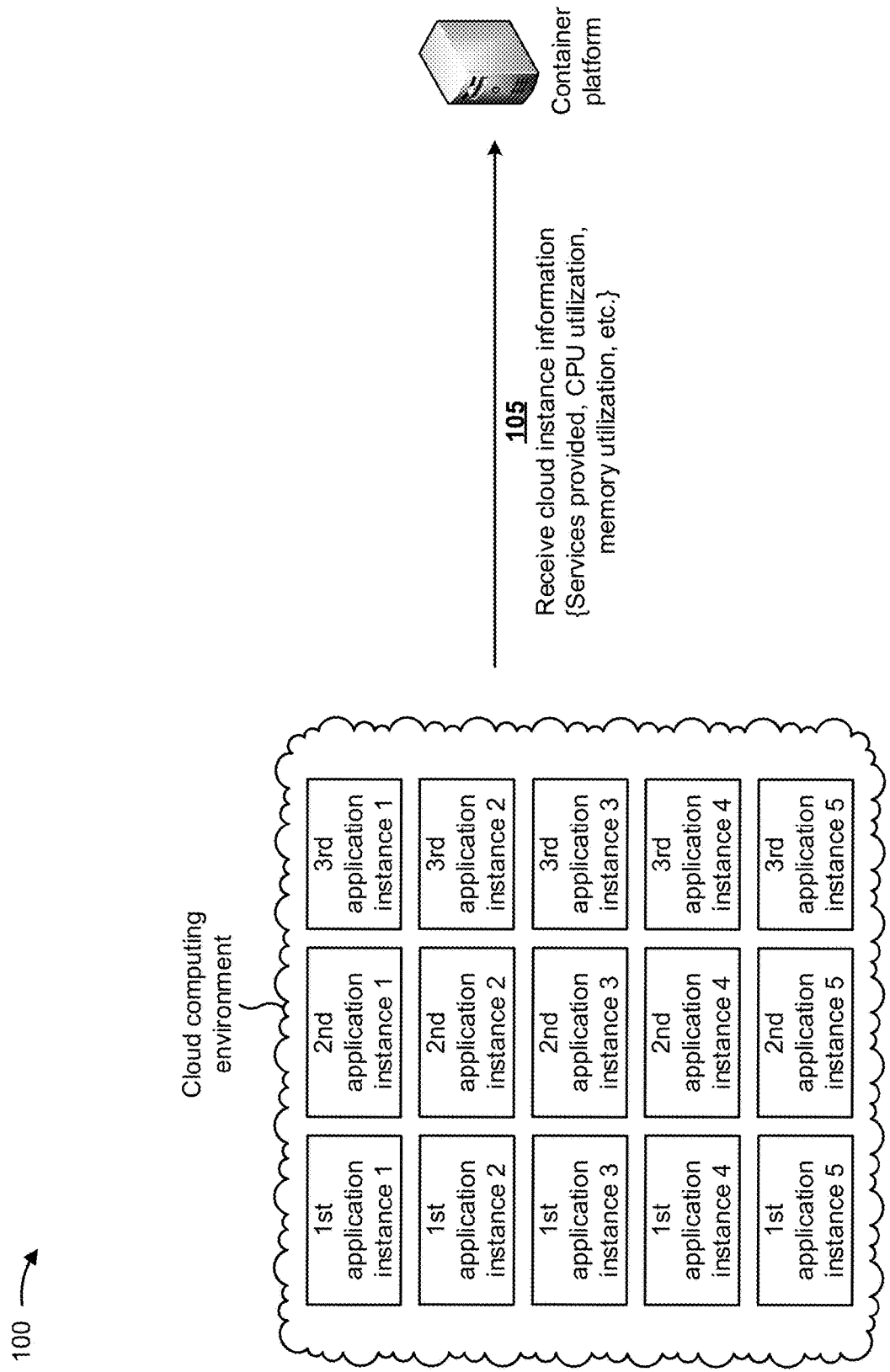
FIGS. 1A-1I are diagrams of an example implementation described herein.

FIGS. 1A-1I are diagrams of an example implementation 100 described herein. As shown in FIG. 1A, a cloud computing environment may be associated with a container platform. The cloud computing environment may include cloud instances for different services provided by the cloud computing environment for an entity (e.g., a company, an educational institution, a government agency, and/or the like). For example, the cloud computing environment may include a quantity (e.g., five) of first application instances (e.g., virtual machines) that provide services (e.g., application programming interfaces (APIs), database services, miscellaneous services, and/or the like) for a first application; a quantity of second application instances that provide services (e.g., APIs, database services, miscellaneous services, and/or the like) for a second application; a quantity of third application instances that provide services (e.g., APIs, database services, miscellaneous services, and/or the like) for a third application; and/or the like. The quantity of cloud instances depicted in FIG. 1A is provided as an example, and the cloud computing environment may include more or fewer cloud instances than shown in FIG. 1A.

As further shown in FIG. 1A, and by reference number 105, the container platform may receive cloud instance information from the cloud computing environment. In some implementations, the container platform may continuously receive the cloud instance information, may periodically receive the cloud instance information, and/or the like. In some implementations, the container platform may store the cloud instance information in a memory device associated with the container platform. In some implementations, the cloud instance information may include information indicating services provided by each of the cloud instances, processor, or central processing unit (CPU), utilization by each of the cloud instances, memory utilization by each of the cloud instances, and/or the like.

Figure 1B:
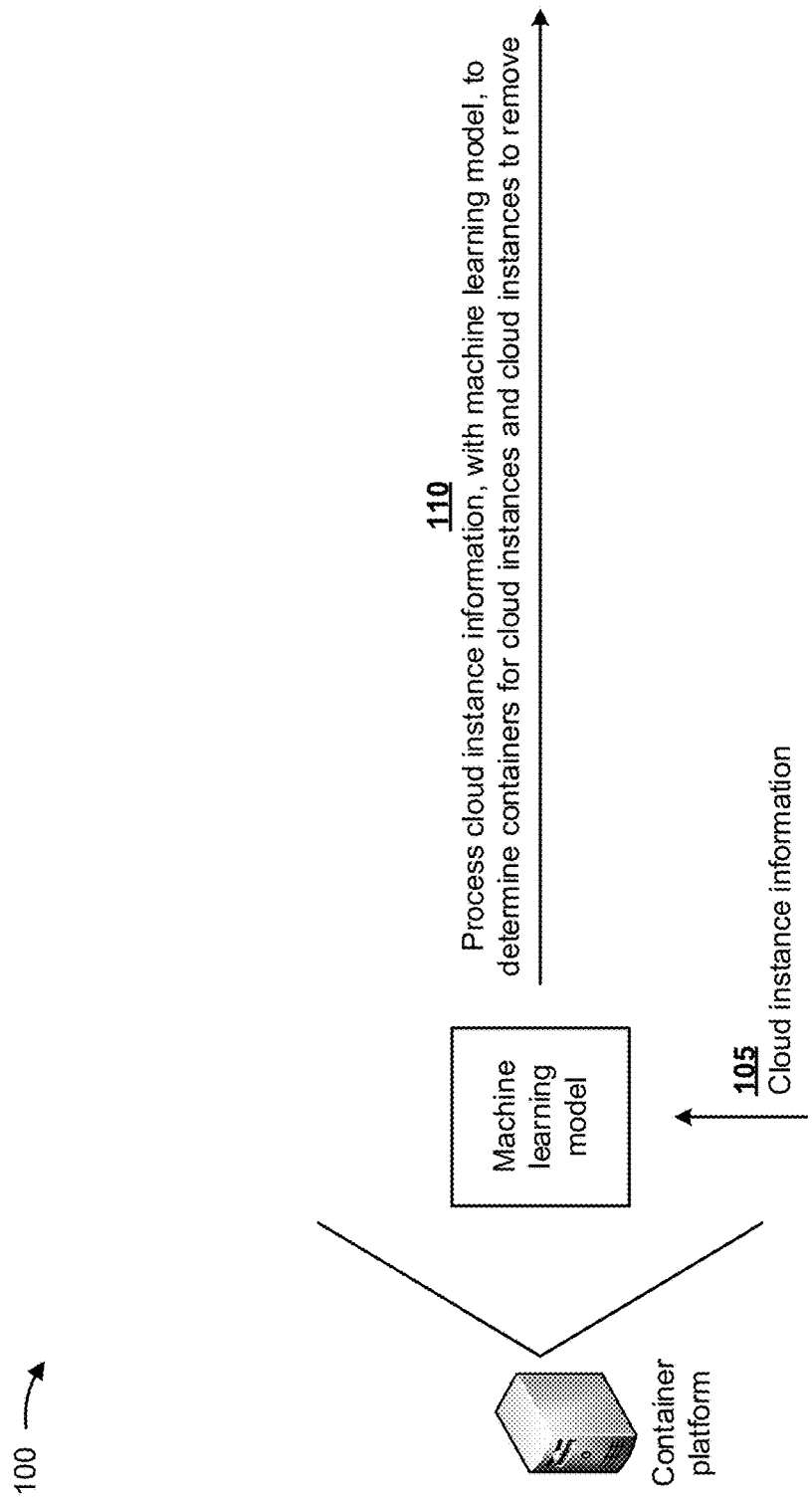

As shown in FIG. 1B, and by reference numbers 105 and 110, the container platform may process the cloud instance information, with a machine learning model, to determine containers for the cloud instances and to determine cloud instances to remove from the cloud computing environment. In some implementations, a container may include a standalone, executable package of software that includes everything needed for execution (e.g., code, runtime tools, system tools, system libraries, settings, and/or the like). A container may isolate software from surroundings and may reduce conflicts between users of the entity executing different software in a same cloud computing environment. In some implementations, multiple containers may execute on the same computing device, and may share an operating system kernel with other containers. In contrast, cloud instances (e.g., virtual machines) are an abstraction of physical hardware that turns one device into many devices. A hypervisor allows multiple cloud instances to execute on a single device, and each cloud instance includes a full copy of an operating system, one or more applications, necessary binaries and libraries, and/or the like. Thus, containers more efficiently utilize hardware (e.g., processors, memory, etc.) than cloud instances.

In some implementations, the container platform may utilize the machine learning model to analyze the cloud instances and to determine which of the cloud instances are similar based on the analysis. The container platform may utilize the machine learning model to determine a utilization (e.g., 75% utilization) associated with the similar cloud instances, and to suggest removing a particular quantity of the similar cloud instances (e.g., 25% of the similar cloud instances) since they are not being utilized efficiently. The container platform may utilize the machine learning model to suggest grouping the remaining similar cloud instances in a container since a container may operate more efficiently than individual cloud instances.

In some implementations, the container platform may train the machine learning model with training data to form rules, for the machine learning model, that will predict cloud instances to remove, cloud instances to group to together in a container, how to optimally group the cloud instances in containers, and/or the like. In such implementations, the training data may include information indicating current utilizations of the cloud instances, the cloud computing environments where the cloud instances are located, which cloud instances are located in which cloud computing environments, processor load in each cloud instance, processor load in each cloud computing environment, memory load in each cloud computing environment, memory load in each cloud instance, computing resource load in each cloud computing environment, computing resource load in each cloud instance, which cloud instances are located on which computing resources, a quantity of the cloud instances in each cloud computing environment, a quantity of the cloud computing environments, future utilizations of the cloud instances, future utilizations of the cloud computing environment, and/or the like.

In some implementations, the container platform may manage hundreds, thousands, etc. of cloud computing environments, associated with multiple entities, that include millions, trillions, billions, etc. of cloud instances, and thus may present a big data problem. In some implementations, the entity may be associated with cloud instances provided in multiple different cloud computing environments, and the container platform may manage the cloud instances across the multiple different cloud computing environments. In some implementations, the container platform may utilize the machine learning model to reduce the cloud instances in each of the cloud computing environments. In this way, the container platform may manage a complex, big data problem quickly and efficiently.

In some implementations, the container platform may test the machine learning model. For example, the container platform may train the machine learning model based on the training data to predict outcomes (e.g., cloud instances to remove, cloud instances to group to together in a container, how to optimally group the cloud instances in containers, and/or the like). The container platform may compare the predicted outcomes with expected outcomes in order to test the machine learning model. In some implementations, the container platform may continuously update the machine learning model based on the testing and by incremental learning, reinforcement learning, online learning, and/or the like. The container platform may repeat this procedure until correct predictions are generated by the machine learning model.

In some implementations, the machine learning model may output information indicating cloud instances to remove from one of more cloud computing environments, reasons the cloud instances are to be removed (e.g., processor underutilization, memory underutilization, cloud instance underutilization, and/or the like), cloud instances to group to together in a container, reasons the cloud instances are to be grouped together in a container (e.g., similarity of cloud instances, more efficient processor utilization, more efficient memory utilization, and/or the like), how to optimally group the cloud instances in containers, and/or the like.

In some implementations, the container platform may utilize the output of the machine learning model to cause the one or more cloud computing environments to remove one or more cloud instances, group two or more cloud instances in a container, to more efficiently process information, and/or the like; to reduce resource utilization by the one or more cloud computing environments; to save costs associated with the reduced resource utilization; and/or the like.

In some implementations, the machine learning model may include one or more of an exploratory factor analysis model, a confirmatory factor analysis model, a principal component analysis model, a k-means clustering model, a least absolute shrinkage and selection operator (Lasso) regression analysis model, and/or the like.

The exploratory factor analysis model may include a statistical model used to uncover an underlying structure of a relatively large set of variables. For example, the exploratory factor analysis model may perform a factor analysis technique with an objective to identify underlying relationships between measured variables. Measured variables may include any one of several attributes of a subject (e.g., a physical height of a human being) that may be observed and measured. The exploratory factor analysis model is based on a common factor model, within which a function of common factors, unique factors, and errors of measurements expresses measured variables. Common factors influence two or more measured variables, while each unique factor influences one measured variable and does not explain correlations among measured variables.

The confirmatory factor analysis model may include a form of factor analysis that is used to test whether measures of a construct are consistent with a preliminary conception of a nature of the construct. As such, an objective of the confirmatory factor analysis model is to test whether data fits a hypothesized measurement model that is based on theory and/or previous analytic research.

The principal component analysis model may include a statistical procedure that uses an orthogonal transformation to convert a set of observations of possibly correlated variables into a set of values of linearly uncorrelated variables called principal components. A number of distinct principal components is equal to a smaller of a number of original variables or a number of observations minus one. The orthogonal transformation may be defined in such a way that a first principal component has a largest possible variance (e.g., accounts for as much of a variability in data as possible), and each succeeding component in turn has a highest variance possible under a constraint that it is orthogonal to preceding components. Resulting vectors may include an uncorrelated orthogonal basis set.

The k-means clustering model may be applied to partition (n) observations into (k) clusters in which each observation belongs to a cluster with a nearest mean, serving as a prototype of the cluster, which results in a partitioning of a data space into Voronoi cells. In this case, the k-means clustering model may utilize efficient heuristic methods that converge quickly to a local optimum.

The Lasso regression analysis model may include a regression analysis model that performs both variable selection and regularization in order to enhance a prediction accuracy and interpretability of a statistical model that the Lasso regression analysis model produces. For example, the Lasso regression analysis model may include a shrinkage and selection model for linear regression, and may seek to obtain a subset of predictors that minimizes prediction error for a quantitative response variable. In some implementations, the Lasso regression analysis model may minimize the prediction error by imposing a constraint on the model parameters that cause regression coefficients for some variables to shrink toward zero. Variables with a regression coefficient equal to zero after the shrinkage process may be excluded from the model, while variables with non-zero regression coefficient variables are most strongly associated with the quantitative response variable.

In this way, the container platform may utilize one or more machine learning models to determine the containers for the cloud instances and/or the cloud instances to remove from the cloud computing environment. In some implementations, the container platform may select which one or more of the machine learning models to utilize based on the cloud instance information, user input, and/or the like. In some implementations, the container platform may utilize multiple machine learning models, may weight results of the multiple machine learning models, and may combine the results to obtain a final result (e.g., the containers for the cloud instances and/or the cloud instances to remove).

Figure 1C:
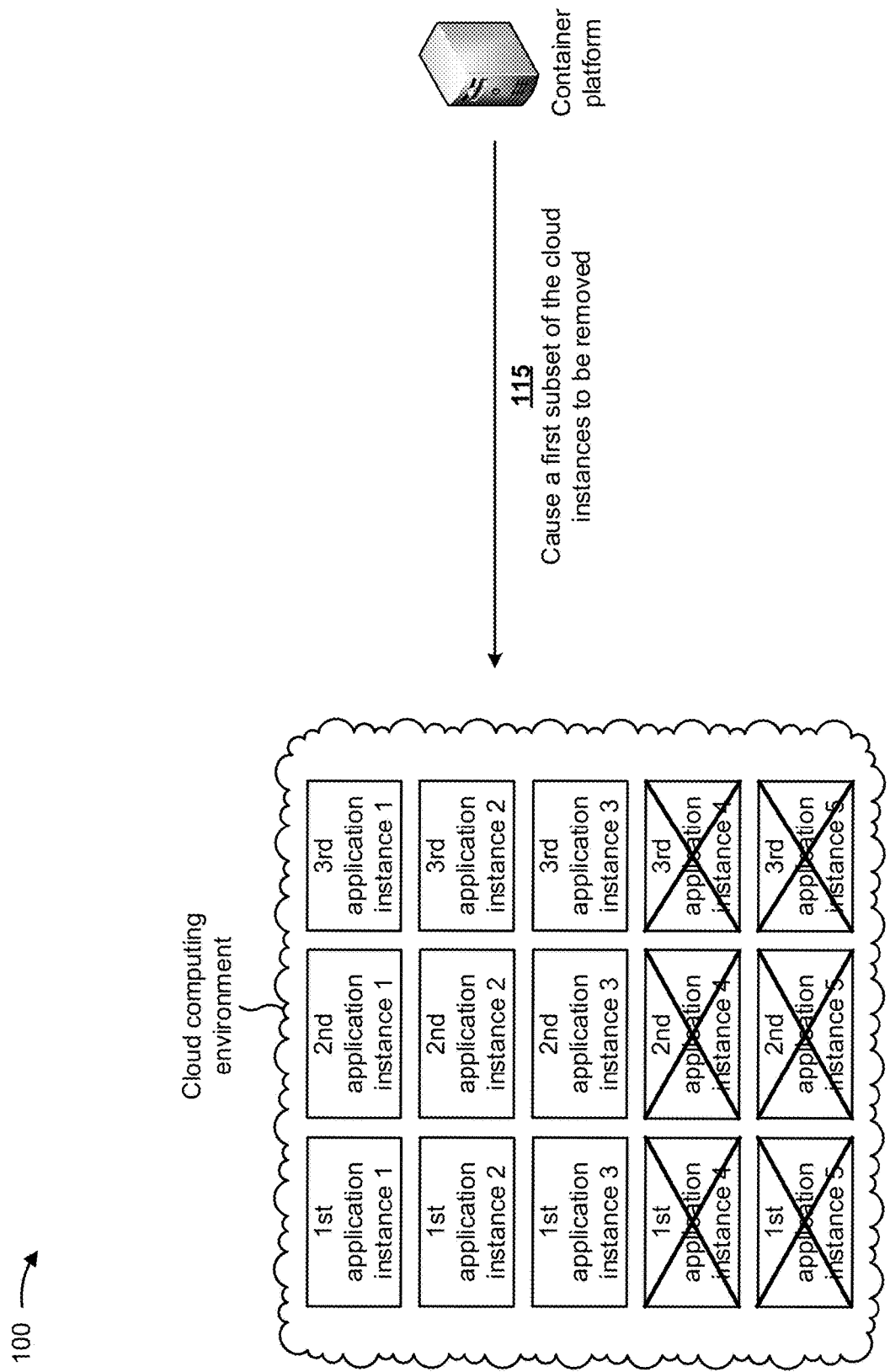

As shown in FIG. 1C, and by reference number 115, the container platform may cause a first subset of the cloud instances to be removed from the cloud computing environment. In some implementations, the first subset of the cloud instances may include the cloud instances identified, by the machine learning model, as needing to be removed from the cloud computing environment. For example, the container platform (e.g., via the machine learning model) may determine that a group of similar cloud instances (e.g., the first application instances) are not efficiently utilizing cloud resources (e.g., processor resources, memory resources, and/or the like), and may cause the group of similar cloud instances to be removed from the cloud computing environment. In another example, the container platform may determine that a cloud instance is not being utilized, is not functioning properly, and/or the like, and that the cloud instance may be removed from the cloud computing environment.

In some implementations, the container platform may cause the first subset of the cloud instances to be removed from the cloud computing environment by providing, to the cloud computing environment, information (e.g., an instruction) instructing the cloud computing environment to remove the first subset of the cloud instances. The cloud computing environment may receive the instruction, and may remove the first subset of the cloud instances based on the instruction. For example, as further shown in FIG. 1C, the cloud computing environment may remove two first application instances (e.g., first application instance 4 and first application instance 5), two second application instances (e.g., second application instance 4 and second application instance 5), and two third application instances (e.g., third application instance 4 and third application instance 5). In some implementations, the cloud computing environment may remove more or fewer cloud instances than depicted in FIG. 1C.

Figure 1D:
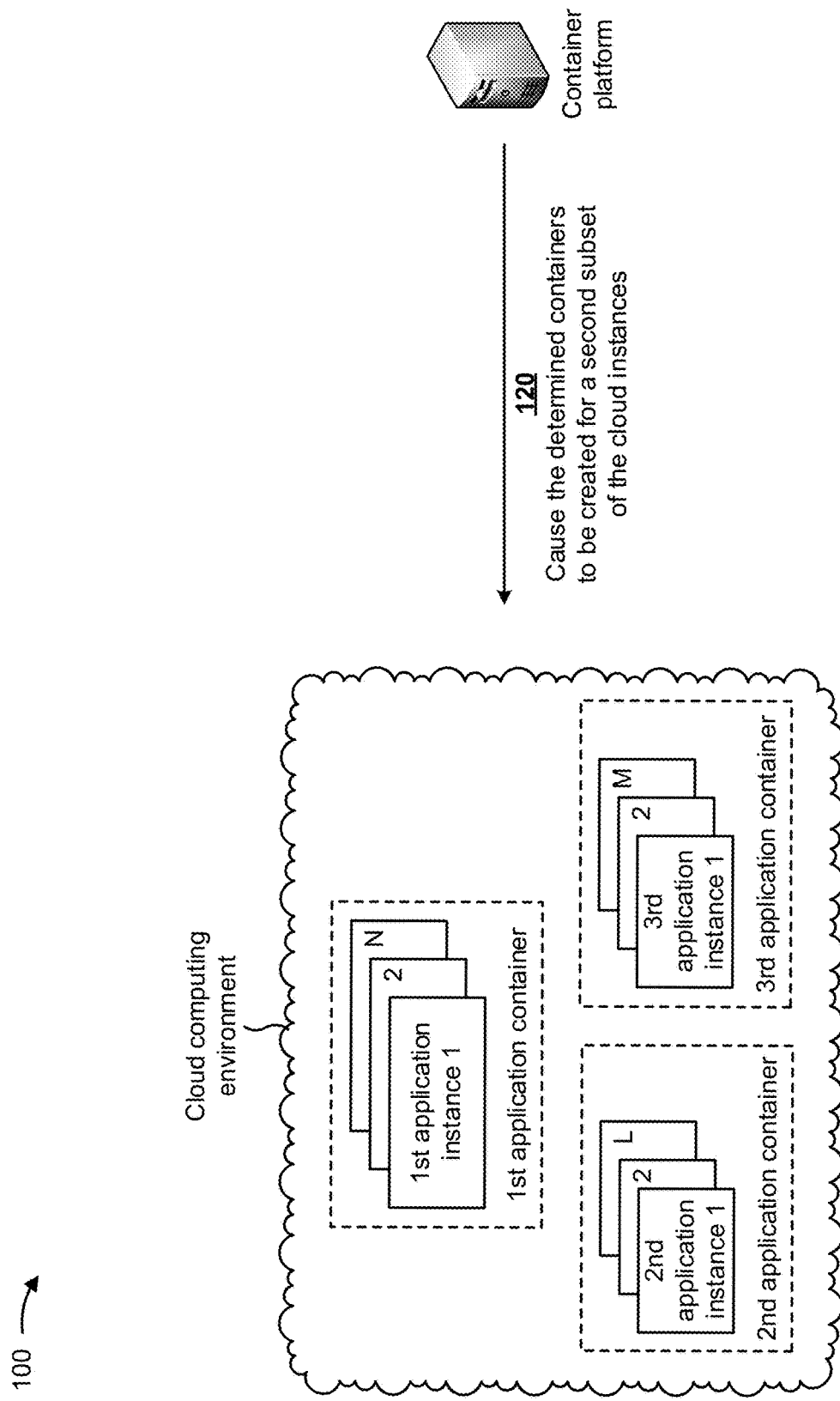

As shown in FIG. 1D, and by reference number 120, the container platform may cause the determined containers to be created for a second subset of the cloud instances. In some implementations, the second subset of the cloud instances may include the cloud instances identified, by the machine learning model, as being similar and as not needing to be removed from the cloud computing environment. For example, the container platform (e.g., via the machine learning model) may determine that a quantity of application instances (e.g., second application instance 1, . . . , second application instance L, L≥1) are similar and are to be included in a second application container. In another example, the container platform (e.g., via the machine learning model) may determine that a quantity of third application instances (e.g., third application instance 1, . . . , third application instance M, M≥1) are similar and are to be included in a third application container. In still another example, the container platform (e.g., via the machine learning model) may determine that a quantity of first application instances (e.g., first application instance 1, . . . , first application instance N, N≥1) are similar and are to be included in a first application container.

In some implementations, the container platform may train the machine learning model with training data to form rules, for the machine learning model, that will predict cloud instances to remove, cloud instances to group to together in a container, how to optimally group the cloud instances in containers, and/or the like, as described elsewhere herein.

In some implementations, the container platform may cause the determined containers to be created for the second subset of the cloud instances in the cloud computing environment by providing, to the cloud computing environment, information (e.g., an instruction) instructing the cloud computing environment to create the containers for the second subset of the cloud instances. The cloud computing environment may receive the instruction, and may create the containers for the second subset of the cloud instances based on the instruction. For example, as further shown in FIG. 1D, the cloud computing environment may create the second application container with multiple second application instances (e.g., second application instance 1, . . . , second application instance L), may create the third application container for multiple third application instances (e.g., third application instance 1, . . . , third application instance M), and may create the first application container for multiple first application instances (e.g., first application instance 1, . . . , first application instance N). In some implementations, the cloud computing environment may create more or fewer containers, with more or fewer cloud instances, than depicted in FIG. 1D.

In some implementations, a container may share resources among cloud instances provided within the container so that the cloud instances are more efficiently utilized (e.g., with respect to processor utilization, memory utilization, and/or the like). In some implementations, a container may isolate the cloud instances, provided within the container, from surroundings. In some implementations, multiple containers may execute on the same computing device, and may share an operating system kernel with other containers. In some implementations, a container may provide secure communications (e.g., via a security policy) between the cloud instances provided within the container, may provide secure communications (e.g., via a container firewall) with other containers and/or cloud instances provided in the other containers, and/or the like.

Figure 1E:
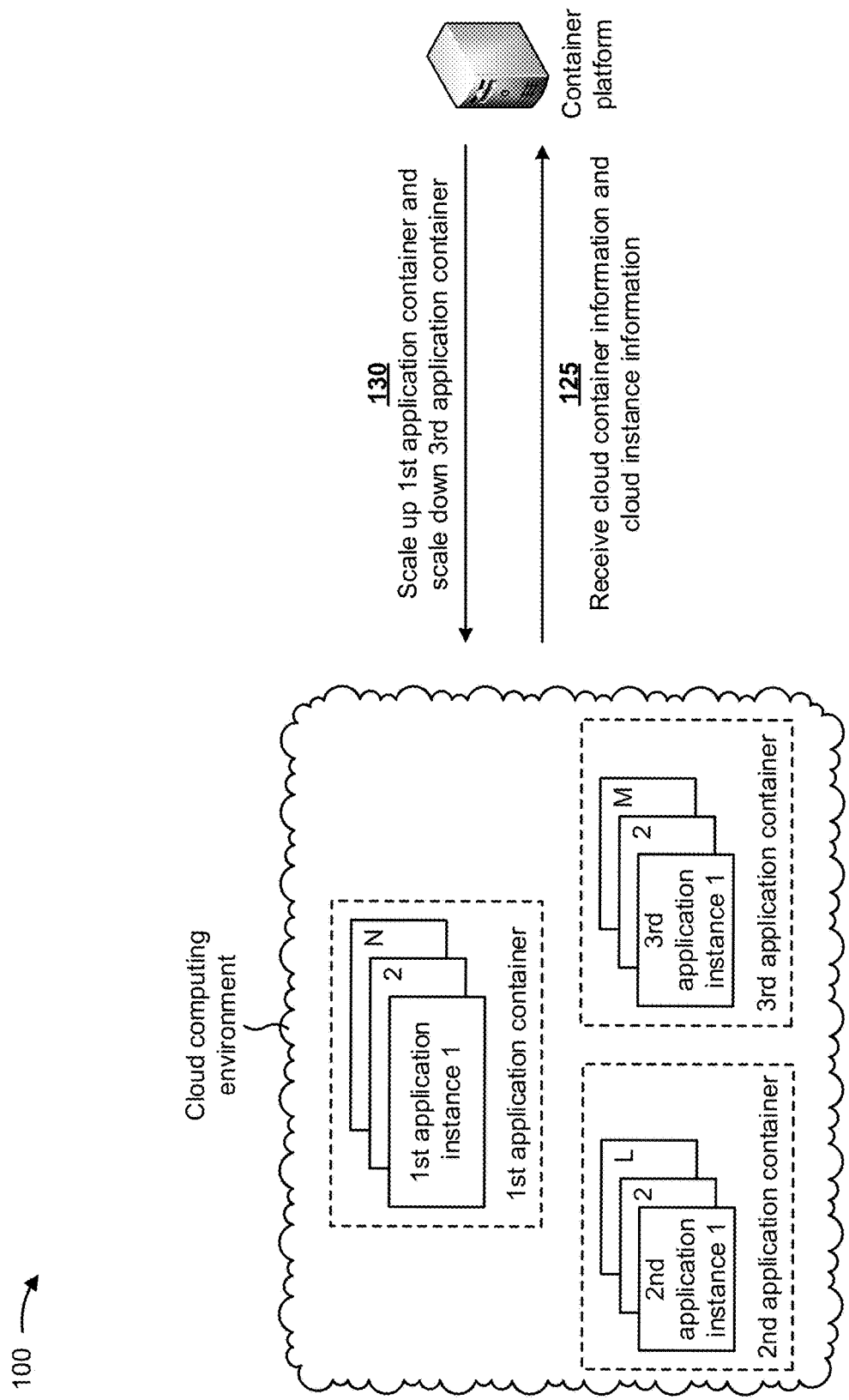

As shown in FIG. 1E, and by reference number 125, the container platform may receive, from the cloud computing environment, cloud container information and cloud instance information. In some implementations, the cloud container information may include information indicating resource (e.g., processor, memory, and/or the like) utilization by all cloud instances within a container, resource utilization by each of the containers, resource utilization by all of the containers, and/or the like. In some implementations, the cloud instance information may include information indicating resource utilization by each cloud instance provided within each container, resource utilization by cloud instances across containers and across cloud computing environments, and/or the like.

In some implementations, the container platform may determine whether to scale (e.g., up or down) each of the containers based on the cloud container information and/or the cloud instance information. For example, if a particular container is utilizing almost all of the resources allotted to the particular container, the container platform may scale up the container by causing the cloud computing environment to add one or more cloud instances to the particular container, allocate more resources to the particular container, and/or the like. In another example, if the particular container is underutilizing the resources allotted to the particular container, the container platform may scale down the container by causing the cloud computing environment to remove one or more cloud instances from the particular container, allocate fewer resources to the particular container, and/or the like.

As further shown in FIG. 1E, and by reference number 130, the container platform may cause the cloud computing environment to scale up the first application container and scale down the third application container, based on the cloud container information and/or the cloud instance information. In some implementations, the container platform may cause the cloud computing environment to scale at the container level, at the cloud instance level, and/or the like, based on the cloud container information and/or the cloud instance information.

Figure 1F:
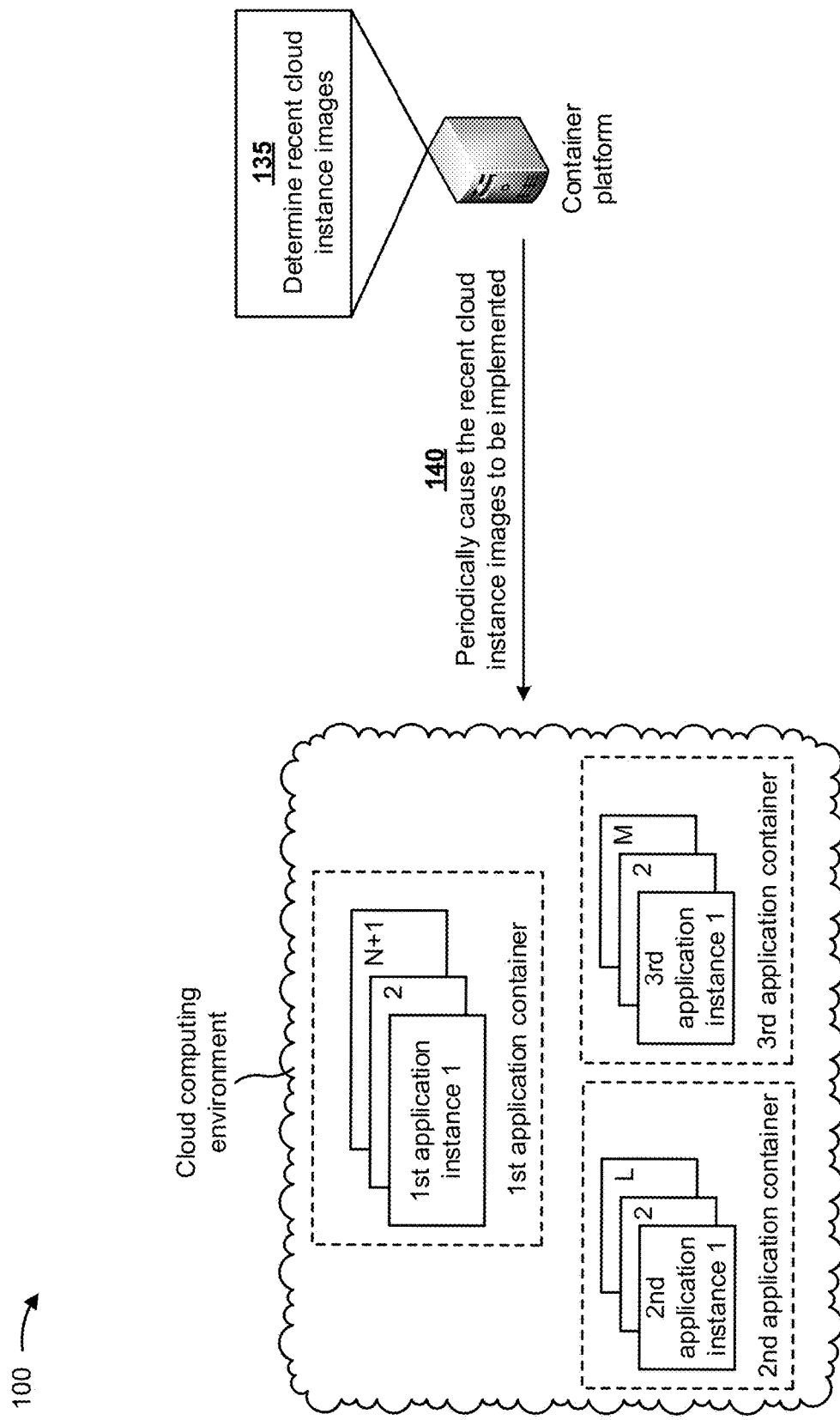

As shown in FIG. 1F, and by reference number 135, the container platform may determine recent images associated with the cloud instances. In some implementations, an image associated with a cloud instance may include information to launch a cloud instance in the cloud computing environment. For example, an image may include a template for a root volume for a cloud instance (e.g., an operating system, an application server, an application, and/or the like), launch permissions that control which accounts can use the image to launch cloud instances, a block device mapping that specifies volumes to attach to a cloud instance when the cloud instance is launched, and/or the like.

As shown in FIG. 1F, and by reference number 140, the container platform may periodically cause the recent images associated with the cloud instances to be implemented in the cloud computing environment (e.g., to update the cloud instances). In some implementations, the container platform may periodically cause the recent images associated with the cloud instances to be implemented in the cloud computing environment by providing, to the cloud computing environment, information instructing the cloud computing environment to implement the recent images associated with the cloud instances. The cloud computing environment may receive the instruction, and may implement the recent images associated with the cloud instances in the cloud computing environment based on the instruction. For example, the cloud computing environment may implement the recent images associated with the first application instances provided in the first application container, the second application instances provided in the second application container, the third application instances provided in the third application container, and/or the like.

Figure 1G:
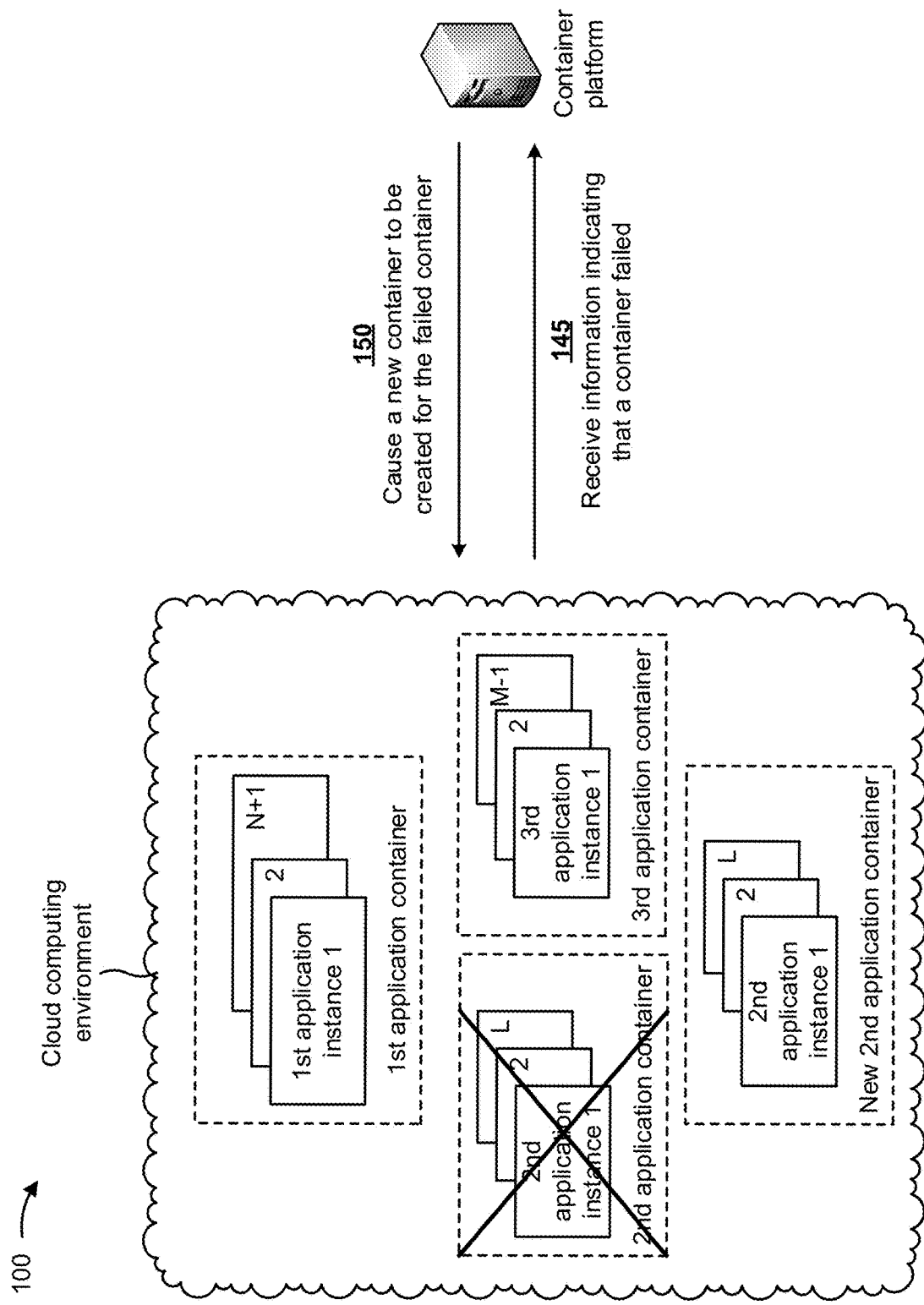

As shown in FIG. 1G, and by reference number 145, the container platform may receive, from the cloud computing environment, information indicating that a container (e.g., the second application container) failed. In some implementations, the container platform may automatically cause the cloud computing environment to restart services (e.g., services provided by the second application instances) associated with the failed container so that services of the failed container may be quickly utilized again. For example, the container platform may automatically cause the cloud computing environment to restart the services associated with the failed container by providing, to the cloud computing environment, information (e.g., an instruction) instructing the cloud computing environment to restart the services associated with the failed container. The cloud computing environment may receive the instruction, and may restart the services associated with the failed container based on the instruction.

In some implementations, and as further shown by reference number 150 of FIG. 1G, the container platform may cause a new container to be created for the failed container. In some implementations, the container platform may cause the new container to be created for the failed container by providing, to the cloud computing environment, information (e.g., an instruction) instructing the cloud computing environment to create the new container for the failed container. The cloud computing environment may receive the instruction, and may create the new container for the failed container based on the instruction. For example, as shown in FIG. 1G, the cloud computing environment may create a new second application container (e.g., with new second application instances) for the failed second application container.

Figure 1H:
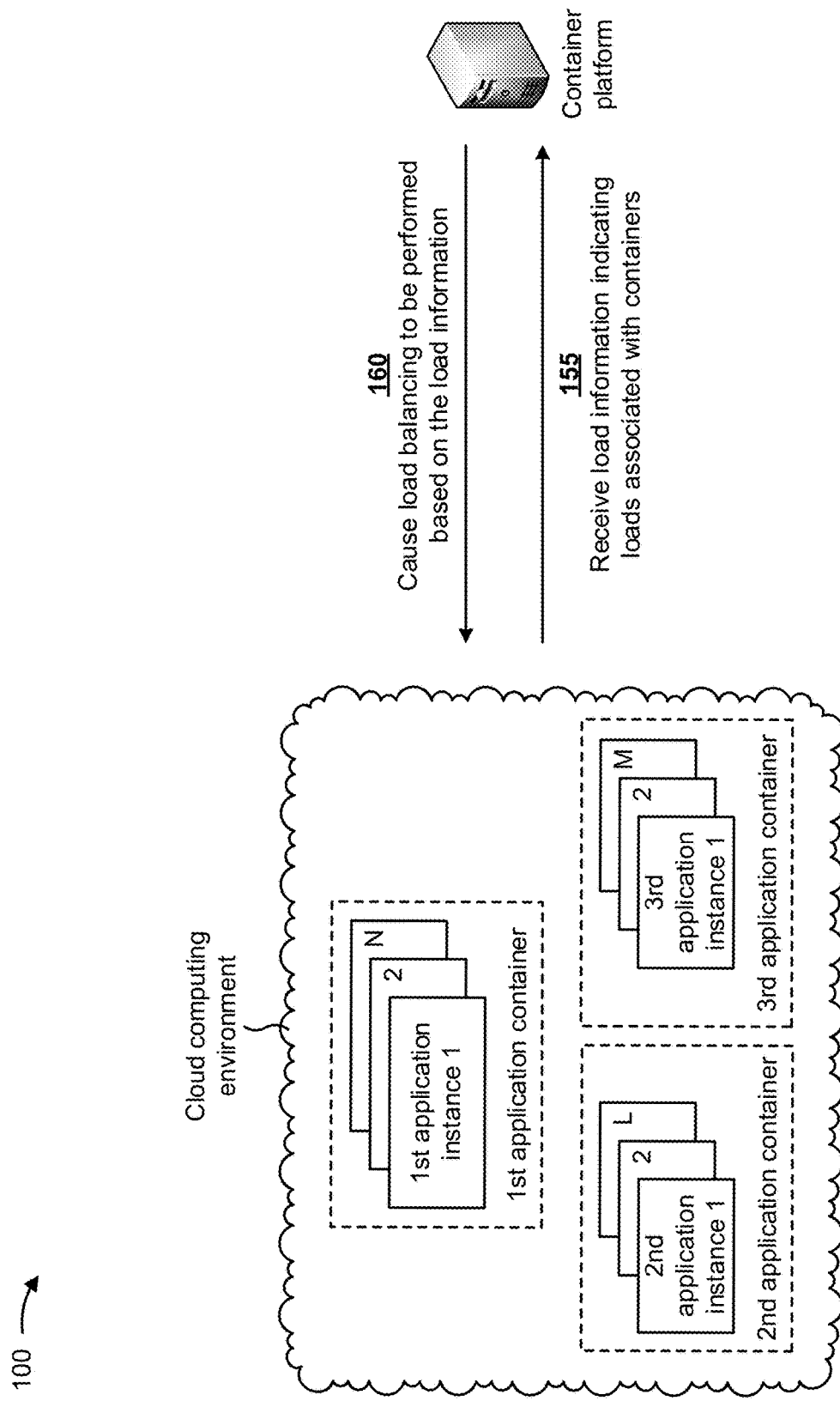

As shown in FIG. 1H, and by reference number 155, the container platform may receive, from the cloud computing environment, load information indicating loads associated with the containers. In some implementations, the container platform may continuously receive the load information, may periodically receive the load information, and/or the like. In some implementations, the loads associated with the containers may include information indicating resource (e.g., processors, memory, and/or the like) utilization by the containers.

As further shown in FIG. 1H, and by reference number 160, the container platform may cause load balancing to be performed for the containers based on the load information. In some implementations, the container platform may cause load balancing to be performed for the containers by providing, to the cloud computing environment, information (e.g., an instruction) instructing the cloud computing environment to perform the load balancing for the containers. The cloud computing environment may receive the instruction, and may perform the load balancing for the containers based on the instruction. In some implementations, the load balancing may include directing traffic from a cloud instance (e.g., at maximum utilization) in a container to a different cloud instance (e.g., at less than maximum utilization), evenly balancing traffic among cloud instances within a container, and/or the like.

Figure 1I:
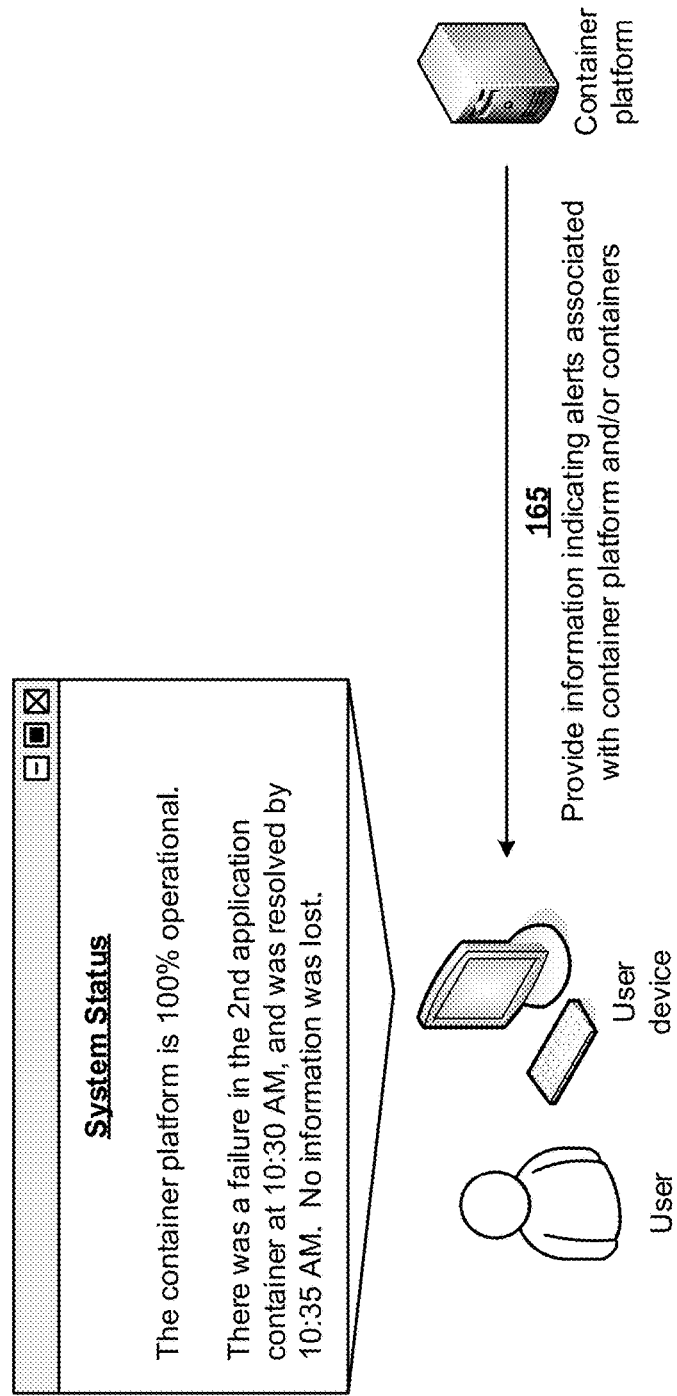

As shown in FIG. 1I, and by reference number 165, the container platform may provide, to a user device, information indicating alerts associated with the container platform, one or more containers, and/or one or more cloud instances. In some implementations, the container platform may provide, to the user device, the information indicating the alerts when the alerts are generated by the container platform, upon request from a user of the user device, periodically (e.g., daily, weekly, monthly, etc.), and/or the like. In some implementations, the information indicating the alerts may include information indicating an operation state of the container platform, errors associated with the container platform, errors associated with the containers, errors associated with the cloud instances, failures associated with the containers, failures associated with the cloud instances, and/or the like.

In some implementations, the user device may display the information indicating the results to the user via a user interface. For example, the user interface may display information indicating that the container platform is 100% operational, that there was a failure in the second application container at 10:30 AM, that the failure was resolved by 10:35 AM, that no information was lost from the second application container, and/or the like.

In this way, several different stages of the process for utilizing machine learning to reduce cloud instances in a cloud computing environment are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes machine learning to reduce cloud instances in a cloud computing environment, as described herein. Finally, automating the process for utilizing machine learning to reduce cloud instances in a cloud computing environment conserves computing resources (e.g., processing resources, memory resources, and/or the like) associated with the cloud computing environment and that would otherwise be wasted in attempting to reduce cloud instances in the cloud computing environment.

As indicated above, FIGS. 1A-1I are provided merely as examples. Other examples are possible and may differ from what was described with regard to FIGS. 1A-1I.

Figure 2:
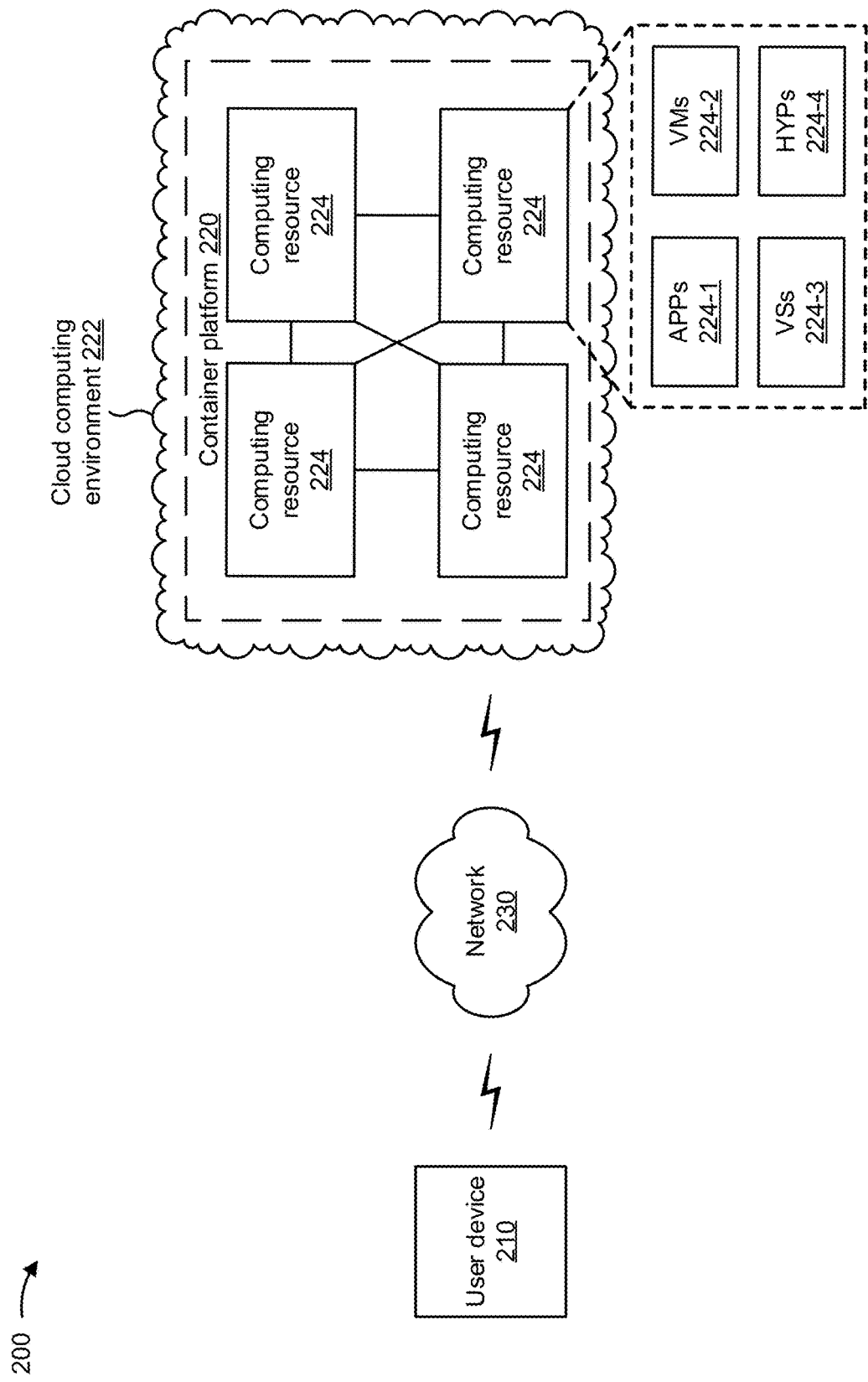
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a container platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to container platform 220.

Container platform 220 includes one or more devices that utilize machine learning to determine data storage pruning parameters. In some implementations, container platform 220 may be designed to be modular such that certain software components may be swapped in or out depending on a particular need. As such, container platform 220 may be easily and/or quickly reconfigured for different uses. In some implementations, container platform 220 may receive information from and/or transmit information to one or more user devices 210. In some implementations, container platform 220 may be provided in the same cloud computing environment as the cloud computing with the containers or in a different cloud computing than the cloud computing environment with the containers.

In some implementations, as shown, container platform 220 may be hosted in a cloud computing environment 222. Notably, while implementations described herein describe container platform 220 as being hosted in cloud computing environment 222, in some implementations, container platform 220 may not be cloud-based (i.e., may be implemented outside of a cloud computing environment) or may be partially cloud-based.

Cloud computing environment 222 includes an environment that hosts container platform 220. Cloud computing environment 222 may provide computation, software, data access, storage, etc. services that do not require end-user knowledge of a physical location and configuration of system(s) and/or device(s) that hosts container platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host container platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with container platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of first application to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of container platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
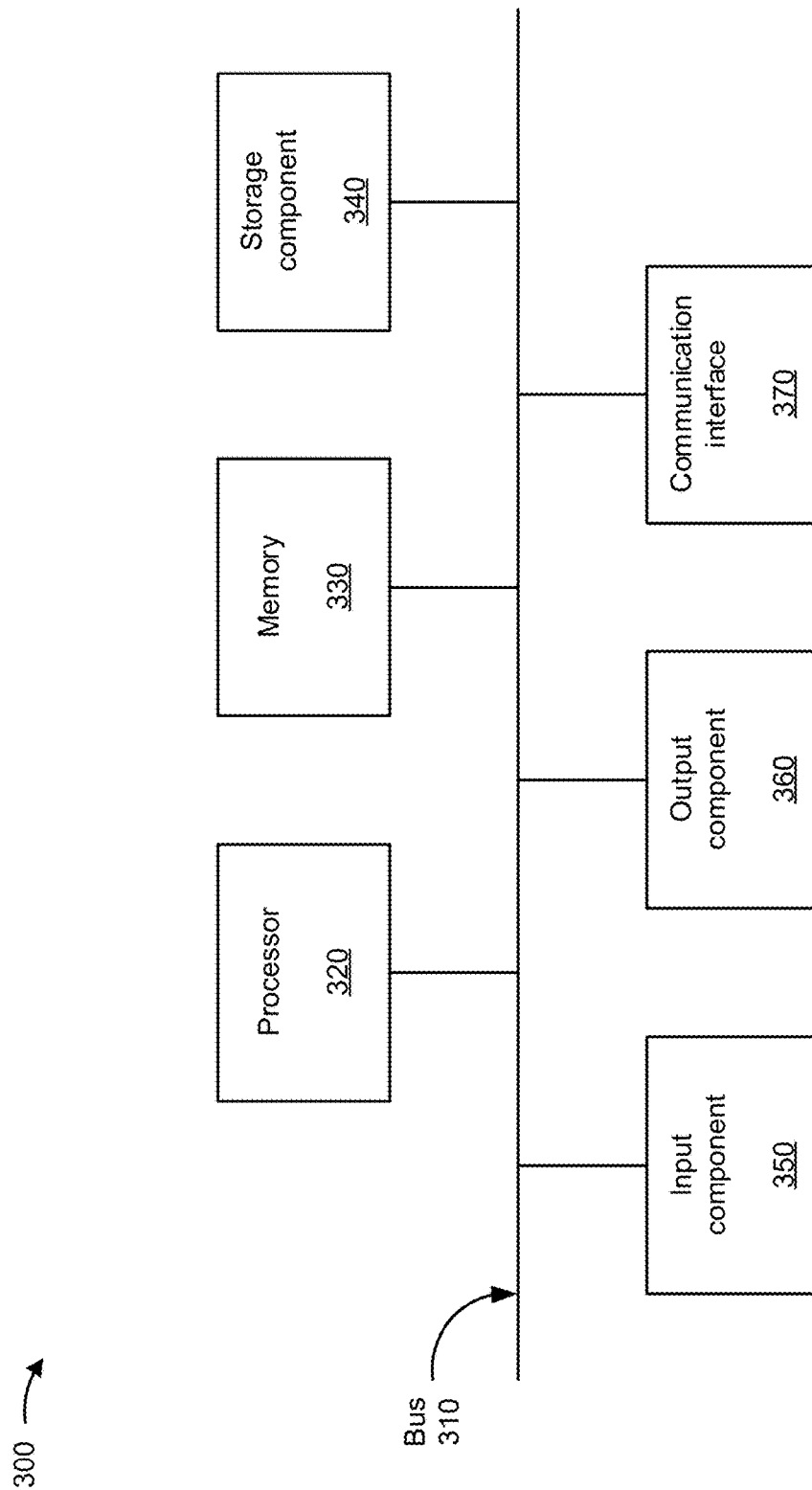
FIG. 3 is a diagram of example components of one or more devices of FIG. 2.

FIG. 3 is a diagram of example components of a device 300. Device 300 may correspond to user device 210, container platform 220, and/or computing resource 224. In some implementations, user device 210, container platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
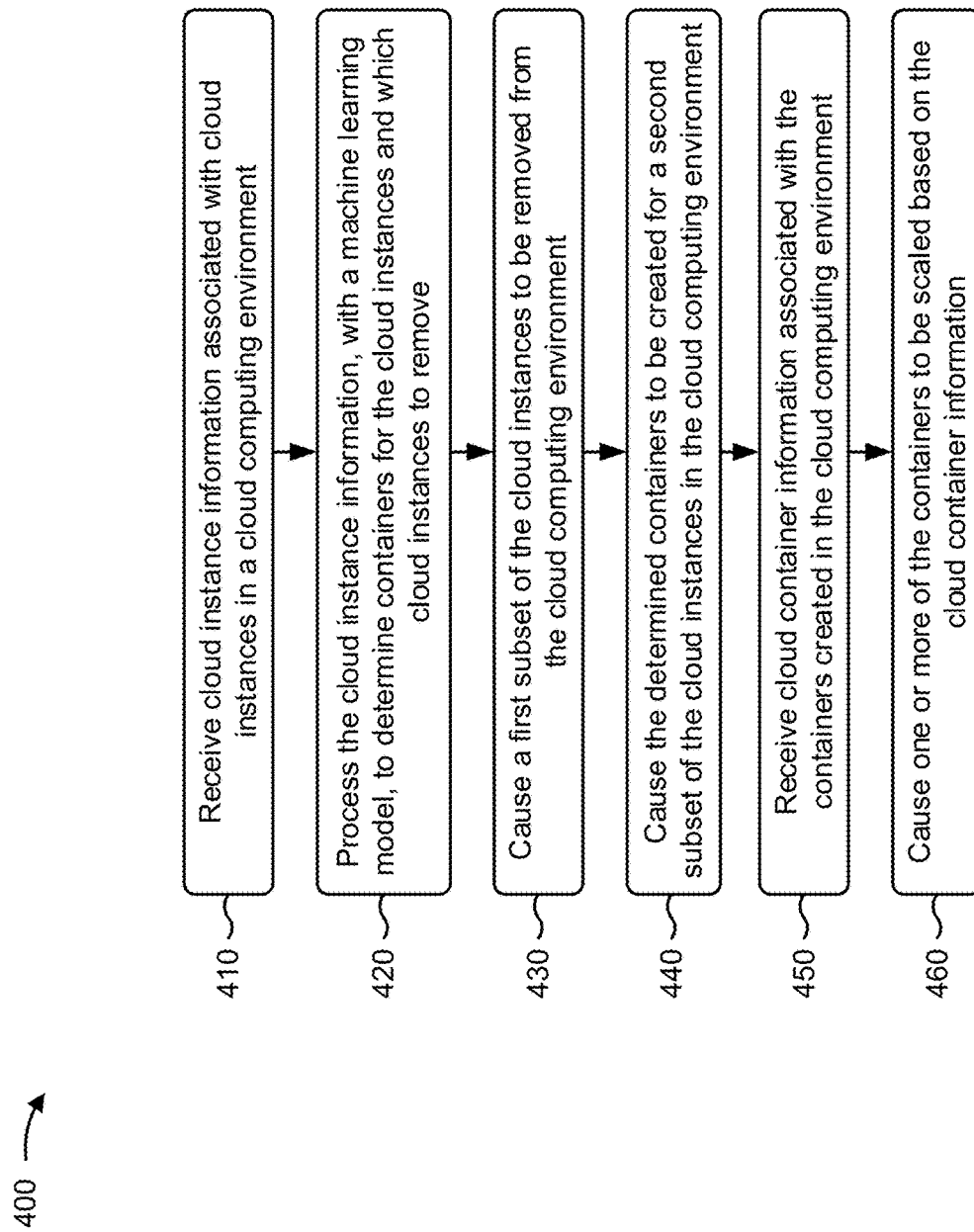
FIG. 4 is a flow chart of an example process for utilizing machine learning to reduce cloud instances in a cloud computing environment.

FIG. 4 is a flow chart of an example process 400 for utilizing machine learning to determine data storage pruning parameters. In some implementations, one or more process blocks of FIG. 4 may be performed by a container platform (e.g., container platform 220). In some implementations, one or more process blocks of FIG. 4 may be performed by another device or a group of devices separate from or including the container platform, such as a user device (e.g., user device 210).

As shown in FIG. 4, process 400 may include receiving cloud instance information associated with cloud instances in a cloud computing environment (block 410). For example, the container platform (e.g., using computing resource 224, processor 320, communication interface 370, and/or the like) may receive cloud instance information associated with cloud instances in a cloud computing environment, as described above in connection with FIGS. 1A-2.

As further shown in FIG. 4, process 400 may include processing the cloud instance information, with a machine learning model, to determine containers for the cloud instances and which cloud instances to remove (block 420). For example, the container platform (e.g., using computing resource 224, processor 320, memory 330, and/or the like) may process the cloud instance information, with a machine learning model, to determine containers for the cloud instances and which cloud instances to remove, as described above in connection with FIGS. 1A-2.

As further shown in FIG. 4, process 400 may include causing a first subset of the cloud instances to be removed from the cloud computing environment (block 430). For example, the container platform (e.g., using computing resource 224, processor 320, storage component 340, communication interface 370, and/or the like) may cause a first subset of the cloud instances to be removed from the cloud computing environment, as described above in connection with FIGS. 1A-2.

As further shown in FIG. 4, process 400 may include causing the determined containers to be created for a second subset of the cloud instances in the cloud computing environment (block 440). For example, the container platform (e.g., using computing resource 224, processor 320, memory 330, communication interface 370, and/or the like) may cause the determined containers to be created for a second subset of the cloud instances in the cloud computing environment, as described above in connection with FIGS. 1A-2.

As further shown in FIG. 4, process 400 may include receiving cloud container information associated with the containers created in the cloud computing environment (block 450). For example, the container platform (e.g., using computing resource 224, processor 320, communication interface 370, and/or the like) may receive cloud container information associated with the containers created in the cloud computing environment, as described above in connection with FIGS. 1A-2.

As further shown in FIG. 4, process 400 may include causing one or more of the containers to be scaled based on the cloud container information (block 460). For example, the container platform (e.g., using computing resource 224, processor 320, memory 330, communication interface 370, and/or the like) may cause one or more of the containers to be scaled based on the cloud container information, as described above in connection with FIGS. 1A-2.

Process 400 may include additional implementations, such as any single implementation or any combination of implementations described below and/or described with regard to any other process described herein.

In some implementations, the cloud container information may include information indicating processor and memory utilization by the second subset of the cloud instances, and the container platform may cause the one or more containers to be scaled up or down based on the information indicating the processor and memory utilization by the second subset of the cloud instances. In some implementations, the container platform may determine recent images associated with the second subset of the cloud instances, and may periodically cause the recent images to be implemented with the second subset of the cloud instances. In some implementations, the container platform may receive, from the cloud computing environment, information indicating that a particular container, of the containers, failed, and may cause a new container to be created for the particular container based on receiving the information indicating that the particular container failed.

In some implementations, the container platform may receive, from the cloud computing environment, load information indicating loads associated with the containers of the cloud computing environment, and may cause load balancing to be performed for the containers based on the load information. In some implementations, the container platform may provide, to a user device, information indicating alerts associated with the device and the containers of the cloud computing environment. In some implementations, the cloud container information may include information indicating processor and memory utilization by the second subset of the cloud instances, and the container platform may cause one or more of the second subset of the cloud instances to be scaled up or down based on the information indicating the processor and memory utilization by the second subset of the cloud instances.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing machine learning to reduce cloud instances in a cloud computing environment and for refreshing cloud instances. In some implementations, one or more process blocks of FIG. 5 may be performed by a container platform (e.g., container platform 220). In some implementations, one or more process blocks of FIG. 5 may be performed by another device or a group of devices separate from or including the container platform 220, such as a user device (e.g., user device 210).

As shown in FIG. 5, process 500 may include receiving cloud instance information associated with cloud instances in a cloud computing environment (block 510). For example, the container platform (e.g., using computing resource 224, processor 320, communication interface 370, and/or the like) may receive cloud instance information associated with cloud instances in a cloud computing environment, as described above in connection with FIGS. 1A-2.

As further shown in FIG. 5, process 500 may include processing the cloud instance information, with a machine learning model, to determine containers for the cloud instances and which cloud instances to remove (block 520). For example, the container platform (e.g., using computing resource 224, processor 320, memory 330, and/or the like) may process the cloud instance information, with a machine learning model, to determine containers for the cloud instances and which cloud instances to remove, as described above in connection with FIGS. 1A-2.

As further shown in FIG. 5, process 500 may include causing a first subset of the cloud instances to be removed from the cloud computing environment (block 530). For example, the container platform (e.g., using computing resource 224, processor 320, storage component 340, communication interface 370, and/or the like) may cause a first subset of the cloud instances to be removed from the cloud computing environment, as described above in connection with FIGS. 1A-2.

As further shown in FIG. 5, process 500 may include causing the determined containers to be created for a second subset of the cloud instances in the cloud computing environment (block 540). For example, the container platform (e.g., using computing resource 224, processor 320, memory 330, communication interface 370, and/or the like) may cause the determined containers to be created for a second subset of the cloud instances in the cloud computing environment, as described above in connection with FIGS. 1A-2.

As further shown in FIG. 5, process 500 may include determining recent images associated with the second subset of the cloud instances (block 550). For example, the container platform (e.g., using computing resource 224, processor 320, communication interface 370, and/or the like) may determine recent images associated with the second subset of the cloud instances, as described above in connection with FIGS. 1A-2.

As further shown in FIG. 5, process 500 may include periodically causing the recent images to be implemented with the second subset of the cloud instances (block 560). For example, the container platform (e.g., using computing resource 224, processor 320, memory 330, communication interface 370, and/or the like) may periodically cause the recent images to be implemented with the second subset of the cloud instances, as described above in connection with FIGS. 1A-2.

Process 500 may include additional implementations, such as any single implementation or any combination of implementations described below and/or described with regard to any other process described herein.

In some implementations, the container platform may receive, from the cloud computing environment, cloud container information associated with the containers created in the cloud computing environment, and may cause one or more of the containers to be scaled based on the cloud container information. In some implementations, the container platform may receive, from the cloud computing environment, information indicating that a particular container, of the containers, failed, and may cause a new container to be created for the particular container, based on receiving the information indicating that the particular container failed. In some implementations, the container platform may receive, from the cloud computing environment, load information indicating loads associated with the containers of the cloud computing environment, and may cause load balancing to be performed for the containers based on the load information.

In some implementations, the container platform may provide, to a user device, information indicating alerts associated with the containers of the cloud computing environment. In some implementations, the container platform may receive, from the cloud computing environment, information indicating that a particular container, of the containers, failed, and may automatically restart services associated with the particular container based on receiving the information indicating that the particular container failed. In some implementations, the container platform may cause services associated with the first subset of the cloud instances to be migrated to the second subset of the cloud instances before removing the first subset of the cloud instances from the cloud computing environment.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing machine learning to reduce cloud instances in a cloud computing environment and for handling failures. In some implementations, one or more process blocks of FIG. 6 may be performed by a container platform (e.g., container platform 220). In some implementations, one or more process blocks of FIG. 6 may be performed by another device or a group of devices separate from or including the container platform, such as a user device (e.g., user device 210).

As shown in FIG. 6, process 600 may include receiving cloud instance information associated with cloud instances in a cloud computing environment (block 610). For example, the container platform (e.g., using computing resource 224, processor 320, communication interface 370, and/or the like) may receive cloud instance information associated with cloud instances in a cloud computing environment, as described above in connection with FIGS. 1A-2.

As further shown in FIG. 6, process 600 may include processing the cloud instance information, with a machine learning model, to determine containers for the cloud instances and which cloud instances to remove (block 620). For example, the container platform (e.g., using computing resource 224, processor 320, memory 330, and/or the like) may process the cloud instance information, with a machine learning model, to determine containers for the cloud instances and which cloud instances to remove, as described above in connection with FIGS. 1A-2.

As further shown in FIG. 6, process 600 may include causing a first subset of the cloud instances to be removed from the cloud computing environment (block 630). For example, the container platform (e.g., using computing resource 224, processor 320, storage component 340, communication interface 370, and/or the like) may cause a first subset of the cloud instances to be removed from the cloud computing environment, as described above in connection with FIGS. 1A-2.

As further shown in FIG. 6, process 600 may include causing the determined containers to be created for a second subset of the cloud instances in the cloud computing environment (block 640). For example, the container platform (e.g., using computing resource 224, processor 320, memory 330, communication interface 370, and/or the like) may cause the determined containers to be created for a second subset of the cloud instances in the cloud computing environment, as described above in connection with FIGS. 1A-2.

As further shown in FIG. 6, process 600 may include receiving information indicating that a particular container, of the containers, failed (block 650). For example, the container platform (e.g., using computing resource 224, processor 320, communication interface 370, and/or the like) may receive information indicating that a particular container, of the containers, failed, as described above in connection with FIGS. 1A-2.

As further shown in FIG. 6, process 600 may include causing a new container to be created for the particular container in the cloud computing environment (block 660). For example, the container platform (e.g., using computing resource 224, processor 320, memory 330, communication interface 370, and/or the like) may cause a new container to be created for the particular container in the cloud computing environment, as described above in connection with FIGS. 1A-2.

Process 600 may include additional implementations, such as any single implementation or any combination of implementations described below and/or described with regard to any other process described herein.

In some implementations, the container platform may receive, from the cloud computing environment, load information indicating loads associated with the containers of the cloud computing environment, and cause load balancing to be performed for the containers based on the load information. In some implementations, the container platform may receive, from the cloud computing environment, cloud container information associated with the containers created in the cloud computing environment, and may cause one or more the containers to be scaled based on the cloud container information.

In some implementations, the container platform may determine recent images associated with the second subset of the cloud instances, and may periodically cause the recent images to be implemented with the second subset of the cloud instances. In some implementations, the container platform may cause services associated with the first subset of the cloud instances to be migrated to the second subset of the cloud instances before removing the first subset of the cloud instances from the cloud computing environment. In some implementations, the container platform may provide, to a user device, information indicating alerts associated with the containers of the cloud computing environment.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a container platform that utilizes machine learning to reduce cloud instances in a cloud computing environment. For example, the container platform may receive, from a cloud computing environment, cloud instance information associated with cloud instances in the cloud computing environment, and may process the cloud instance information, with a machine learning model, to determine containers for one or more of the cloud instances and to determine whether cloud instances should be removed from the cloud computing environment. The container platform may cause a first subset of the cloud instances to be removed from the cloud computing environment, based on determining which of the cloud instances should be removed from the cloud computing environment, and may cause the containers to be created for a second subset of the cloud instances, that is different than the first subset of the cloud instances, based on determining the containers for the one or more of the cloud instances. A container may share resources among cloud instances provided within the container so that the cloud instances are more efficiently utilized (e.g., with respect to processor utilization, memory utilization, and/or the like).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    generating, by a device, a cloud container based on similarities between a plurality of cloud instances,
        wherein the similarities are determined based on analyzing the plurality of cloud instances with a machine learning model;
    receiving, by the device, cloud container information for the cloud container,
        wherein the cloud container information indicates resource utilization of first computing resources used to implement the cloud container;
    receiving, by the device, cloud instance information for one or more cloud instances, of the plurality of cloud instances, executing within the cloud container,
        wherein the cloud instance information indicates resource utilization of second computing resources used to implement the one or more cloud instances;
    determining, by the device and based on at least one of the cloud container information or the cloud instance information, that the cloud container is to be scaled;
    scaling, by the device and based on determining that the cloud container is to be scaled, the cloud container by one or more of:
        allocating additional computing resources to the cloud container,
        adding one or more new cloud instances to the cloud container, or
        removing at least one of the one or more cloud instances from the cloud container; and
    monitoring, by the device and after scaling the cloud container, the cloud container to determine whether additional scaling is to be performed.

2. The method of claim 1, wherein the cloud container information includes information identifying at least one of:
    services provided by the cloud container,
    processor utilization of the cloud container, or
    memory utilization of the cloud container.

3. The method of claim 1, further comprising:
    determining that at least two of the one or more cloud instances are similar to one another; and
    wherein determining that the cloud container is to be scaled comprises:
        determining that the cloud container is to be scaled based on determining that the at least two of the one or more cloud instances are similar to one another.

4. The method of claim 1, further comprising:
    determining, based on at least one of the cloud container information or the cloud instance information, that a first cloud instance, of the one or more cloud instances, is not being utilized or is not properly functioning; and
    wherein determining that the cloud container is to be scaled comprises:
        determining that the cloud container is to be scaled based on determining that the first cloud instance is not being utilized or is not properly functioning.

5. The method of claim 1, further comprising:
    determining, based on at least one of the cloud container information or the cloud instance information, that a group of similar cloud instances, of the one or more cloud instances, are inefficiently utilizing the first computing resources; and wherein determining that the cloud container is to be scaled comprises:
   determining that the cloud container is to be scaled based on determining that the group of similar cloud instances are inefficiently utilizing the first computing resources.

6. The method of claim 1, further comprising:
   creating a new cloud container; and
   wherein scaling the cloud container comprises:
      removing the at least one of the one or more cloud instances from the cloud container; and
      adding the at least one of the one or more cloud instances to the new cloud container.

7. The method of claim 1, wherein monitoring the cloud container comprises:
   periodically receiving additional cloud container information regarding the cloud container; and
   wherein the method further comprises:
      performing additional scaling of the cloud container based on the additional cloud container information.

8. A device, comprising:
   one or more memories; and
   one or more processors, communicatively coupled to the one or more memories, configured to:
      generate a cloud container based on similarities between a plurality of cloud instances,
         wherein the similarities are determined based on analyzing the plurality of cloud instances with a machine learning model;
      receive cloud container information for the cloud container,
         wherein the cloud container information indicates resource utilization of first computing resources used to implement the cloud container;
      receive cloud instance information for one or more cloud instances, of the plurality of cloud instances, executing within the cloud container,
         wherein the cloud instance information indicates resource utilization of second computing resources used to implement the one or more cloud instances;
      determine, based on at least one of the cloud container information or the cloud instance information, that the cloud container is to be scaled;
      scale, based on determining that the cloud container is to be scaled, the cloud container by one or more of:
         allocate additional computing resources to the cloud container,
         add one or more new cloud instances to the cloud container, or
         remove at least one of the one or more cloud instances from the cloud container; and
      monitor, after scaling the cloud container, the cloud container to determine whether additional scaling is to be performed.

9. The device of claim 8, wherein the cloud container information includes information identifying at least one of:
   services provided by the cloud container,
   processor utilization of the cloud container, or
   memory utilization of the cloud container.

10. The device of claim 8, wherein the one or more processors are further configured to:
   determine that at least two of the one or more cloud instances are similar to one another; and
   wherein the one or more processors, when determining that the cloud container is to be scaled, are configured to:
      determine that the cloud container is to be scaled based on determining that the at least two of the one or more cloud instances are similar to one another.

11. The device of claim 8, wherein the one or more processors are further configured to:
   determine, based on at least one of the cloud container information or the cloud instance information, that a first cloud instance, of the one or more cloud instances, is not being utilized or is not properly functioning; and
   wherein the one or more processors, when determining that the cloud container is to be scaled, are configured to:
      determine that the cloud container is to be scaled based on determining that the first cloud instance is not being utilized or is not properly functioning.

12. The device of claim 8, wherein the one or more processors are further configured to:
   determine, based on at least one of the cloud container information or the cloud instance information, that a group of similar cloud instances, of the one or more cloud instances, are inefficiently utilizing the first computing resources; and
   wherein the one or more processors, when determining that the cloud container is to be scaled, are configured to:
      determine that the cloud container is to be scaled based on determining that the group of similar cloud instances are inefficiently utilizing the first computing resources.

13. The device of claim 8, wherein the one or more processors are further configured to:
   create a new cloud container; and
   wherein the one or more processors, when scaling the cloud container, are configured to:
      remove the at least one of the one or more cloud instances from the cloud container; and
      add the at least one of the one or more cloud instances to the new cloud container.

14. The device of claim 8, wherein the one or more processors, when monitoring the cloud container, are configured to:
   periodically receive additional cloud container information regarding the cloud container; and
   wherein the one or more processors are further configured to:
      perform additional scaling of the cloud container based on the additional cloud container information.

15. A non-transitory computer-readable medium storing a set of instructions, the set of instructions comprising:
   one or more instructions that, when executed by one or more processors of a device, cause the device to:
      generate a cloud container based on similarities between a plurality of cloud instances,
         wherein the similarities are determined based on analyzing the plurality of cloud instances with a machine learning model; receive cloud container information for a cloud container,
         wherein the cloud container information indicates resource utilization of first computing resources used to implement the cloud container;
      receive cloud instance information for one or more cloud instances, of the plurality of cloud instances, executing within the cloud container, wherein the cloud instance information indicates resource utilization of second computing resources used to implement the one or more cloud instances;

determine, based on at least one of the cloud container information or the cloud instance information, that the cloud container is to be scaled;

scale, based on determining that the cloud container is to be scaled, the cloud container by one or more of:
allocate additional computing resources to the cloud container,
add one or more new cloud instances to the cloud container, or
remove at least one of the one or more cloud instances from the cloud container; and monitor, after scaling the cloud container, the cloud container to determine whether additional scaling is to be performed.

16. The non-transitory computer-readable medium of claim 15, wherein the cloud container information includes information identifying at least one of:
services provided by the cloud container,
processor utilization of the cloud container, or
memory utilization of the cloud container.

17. The non-transitory computer-readable medium of claim 15, wherein the one or more instructions further cause the device to:
determine that at least two of the one or more cloud instances are similar to one another; and
wherein the one or more instructions, that cause the device to determine that the cloud container is to be scaled, cause the device to:
determine that the cloud container is to be scaled based on determining that the at least two of the one or more cloud instances are similar to one another.

18. The non-transitory computer-readable medium of claim 15, wherein the one or more instructions further cause the device to:
determine, based on at least one of the cloud container information or the cloud instance information, that a first cloud instance, of the one or more cloud instances, is not being utilized or is not properly functioning; and
wherein the one or more instructions, that cause the device to determine that the cloud container is to be scaled, cause the device to:
determine that the cloud container is to be scaled based on determining that the first cloud instance is not being utilized or is not properly functioning.

19. The non-transitory computer-readable medium of claim 15, wherein the one or more instructions further cause the device to:
determine, based on at least one of the cloud container information or the cloud instance information, that a group of similar cloud instances, of the one or more cloud instances, are inefficiently utilizing the first computing resources; and
wherein the one or more instructions, that cause the device to determine that the cloud container is to be scaled, cause the device to:
determine that the cloud container is to be scaled based on determining that the group of similar cloud instances are inefficiently utilizing the first computing resources.

20. The non-transitory computer-readable medium of claim 15, wherein the one or more instructions further cause the device to:
create a new cloud container; and
wherein the one or more instructions, that cause the device to scale the cloud container, cause the device to:
remove the at least one of the one or more cloud instances from the cloud container; and
add the at least one of the one or more cloud instances to the new cloud container.

* * * * *